United States Patent

Hozumi et al.

[15] 3,673,666

[45] July 4, 1972

[54] APPARATUS FOR ASSEMBLING AND SECURING ELECTRICAL COMPONENTS BY DIE COMPACTING

[72] Inventors: Shiro Hozumi, Sakai; Kenichi Hirai, Osaka; Yoshiyuki Tanigawa, Neyagawa; Katuro Yoshida, Osaka; Kanji Sugihara, Hirakata, all of Japan

[73] Assignee: Matsushita Electric Industrial Co., Ltd., Osaka, Japan

[22] Filed: Aug. 19, 1970

[21] Appl. No.: 65,020

[52] U.S. Cl. ....... 29/203 DT
[51] Int. Cl. ....... H01r 43/04
[58] Field of Search ....... 29/203 D, 203 DT, 211 D, 211, 29/203 DS, 203 R, 208 D

[56] References Cited

UNITED STATES PATENTS

| | | | |
|---|---|---|---|
| 2,867,143 | 1/1959 | Appleton | 29/203 D |
| 3,484,937 | 12/1969 | Campbell, Jr. et al. | 29/203 D |

*Primary Examiner*—Thomas H. Eager
*Attorney*—Wenderoth, Lind & Ponack

[57] ABSTRACT

Apparatus for assembling and die compacting electric components having coaxial leads. A pair of lead magazines is provided having a plurality of tubular pins provided with terminal leads inserted into holes formed therein. A pellet magazine which is adapted to have a plurality of pellets inserted into a plurality of holes formed therein is sandwiched between the lead magazines to form a combined magazine. Transfer means transfers the combined magazine to a loading position adjacent, at least one die frame in which a plurality of die-holes are formed and in which heating means is provided. Loading means loads said plurality pellets and leads from said combined magazine into said die blank. Pressing means presses the heated pellets in said die-holes through said pins independently of each other to compact them. Unloading means then uploads the components formed within said die frame from said die frame into an empty combined magazine. With this system batches of hundreds of pellets of raw material for the electric components can be formed into intimate and integral bodies, each of which has coaxial terminal leads embedded in the ends thereof.

7 Claims, 9 Drawing Figures

PATENTED JUL 4 1972

3,673,666

INVENTORS
SHIRO HOZUMI
KENICHI HIRAI
YOSHIYUKI TANIGAWA
KATURO YOSHIDA
KANJI SUGIHARA

BY Wenderoth, Lind & Ponack
ATTORNEYS

INVENTORS
SHIRO HOZUMI
KENICHI HIRAI
YOSHIYUKI TANIGAWA
KATURO YOSHIDA
KANJI SUGIHARA
BY Wenderoth, Lind & Ponack
ATTORNEYS INVENTORS
SHIRO HOZUMI
KENICHI HIRAI
YOSHIYUKI TANIGAWA
KATURO YOSHIDA
KANJI SUGIHARA BY Wenderoth, Lind & Ponack
ATTORNEYS INVENTORS
SHIRO HOZUMI
KENICHI HIRAI
YOSHIYUKI TANIGAWA
KATURO YOSHIDA
KANJI SUGIHARA BY Wenderoth, Lind & Ponack
ATTORNEYS INVENTORS
SHIRO HOZUMI
KENICHI HIRAI
YOSHIYUKI TANIGAWA
KATURO YOSHIDA
KANJI SUGIHARA BY Wenderoth, Lind & Ponack
ATTORNEYS INVENTORS
SHIRO HOZUMI
KENICHI HIRAI
YOSHIYUKI TANIGAWA
KATURO YOSHIDA
KANJI SUGIHARA
BY Wenderoth, Lind & Ponack
ATTORNEYS INVENTORS
SHIRO HOZUMI
KENICHI HIRAI
YOSHIYUKI TANIGAWA
KATURO YOSHIDA
KANJI SUGIHARA BY Wenderoth, Lind & Ponack
ATTORNEYS

APPARATUS FOR ASSEMBLING AND SECURING ELECTRICAL COMPONENTS BY DIE COMPACTING

This invention relates to a system for making solid composite electrical components having co-axial leads embedded therein and more particularly to a system for making solid composite carbon resistors having coaxial leads embedded therein.

Among the various electric components such as resistors, capacitors, varistors and thermistors, there are many which have leads embedded in solid composite material which is in a cylindrical form. For example, solid composite carbon resistors include a cylindrical body in which finely divided carbon powder is uniformly dispersed in a solidified binding material. The cylindrical body can be obtained by compacting a uniform mixture of carbon powder and binding material at a curing temperature and under pressure. In many cases, the cylindrical body is covered by a thick film of insulating material.

In the conventional method of molding, the uniform mixture of carbon powder and binding material is compressed into a small rod by pressing without heating it to a high temperature. The small rod frequently has the cylindrical surface covered by a thick film of insulating material and has no insulating material at the ends so as to make it possible to connect leads therewith. For convenience, this small rod is referred to hereinafter as a pellet. The pellet is inserted into a cylindrical die and is jammed between two punches each having a lead inserted into a center bore thereof. The two leads are inserted into the opposite ends of the pellet by pressing the two punches toward each other and at the same time the pellet is compacted into a solid composite carbon resistor of a given size. It is usually preferred to press the pellet while heating it to promote curing of the binding material.

The electrical properties of the thus obtained resistor are affected not only by the composition of the starting mixture but also by the die compacting conditions such as pressure, temperature and pressing time. Therefore, a close tolerance of electrical properties which is important for high production yield cannot be obtained unless the die compacting conditions as well as the compositions of the starting mixtures are controlled strictly. It is also important to maintain an adequate clearance between the die and the punch. A large clearance is apt to produce unwanted fins at the end surfaces of the compressed body. An additional step is required to remove the unwanted fins. A small clearance makes the lives of the die and the punch shorter because repeated compression steps cause the die and the punch to wear out more quickly.

In general, the solid composite components such as resistors are most widely used components. For example, one TV set uses more than 100 solid composite resistors. Therefore, these solid composite components must be manufactured at a low cost.

An object of this invention is to provide a system for manufacturing solid composite components having leads embedded coaxially therein, which system satisfies the requirements mentioned above.

A further object of this invention is to provide a system for manufacturing solid composite components having leads embedded coaxially therein, which is capable of die compacting a plurality of pellets at the same time and all at the same pressure.

A further object of this invention is to provide a system for manufacturing solid composite components having leads embedded coaxially therein, which is capable of uniformly heating a plurality of pellets in die-holes.

Another object of this invention is to provide a system for manufacturing solid composite components having leads embedded therein, which is characterized by a long life for the dies and punches.

These objects are achieved by providing a system for assembly and die compacting electrical components having coaxial leads, which system comprises:

1. A combined magazine consisting of a pair of lead magazines and a pellet magazine sandwiched between said pair of lead magazines, said pair of lead magazines having a plurality of tubular pins inserted into a plurality of holes therein, each of said plurality of pins being adapted to hold a single terminal lead in a bore therein, and said pellet magazine being adapted to hold a plurality of pellets in a plurality of holes therein;

2. Transfer means for transferring said combined magazine to a loading position;

3. At least one die frame having a plurality of die-holes formed therein;

4. Loading means for loading said plurality of pellets, each accompanied by two leads in the pins at both sides thereof, from said combined magazine at said loading position to said die-holes in said die frame;

5. Heating means for heating said pellets in said die frame;

6. Pressing means for pressing the plurality of heated pellets in said plurality of die-holes in said die frame through said pins independently of each other to compact them, whereby each of said pellets has two leads embedded into both ends thereof to form an electrical component with coaxial leads embedded therein; and 7. Unloading means for unloading the formed components from said die frame into a combined magazine.

The system according to the invention can automatically manufacture batches of hundreds of components of this type when said system further comprises a combination of the following:

1. Unloading means for unloading the plurality of components from said magazine;

2. Detaching means for detaching each of said plural components from said two pins;

3. Dividing means for dividing said combined magazine into said pair of lead magazines and said pellet magazine;

4. First inserting means for inserting the plural of leads into said plurality of pins;

5. Second inserting means for inserting said plurality of pins with leads into said plurality of holes of said lead magazines;

6. Third inserting means for inserting the plurality of pellets into said plurality of holes of said pellet magazine; and 7. Combining means for combining said pellet magazine and said pair of lead magazines into said combined magazine.

Further features of the present invention, and a more thorough understanding thereof, may be had by a consideration of certain embodiments of the present invention, which are described in the following specification and illustrated in the following drawings, wherein.

For the purposes of simplicity, the die compacting system is herein shown and described as being adapted to manufacture so-called carbon composition resistors as an example of electrical components with coaxial leads; however, it will be understood that the system is readily adaptable to the manufacture of other components without substantial modifications in the construction of the system.

Figure 1:
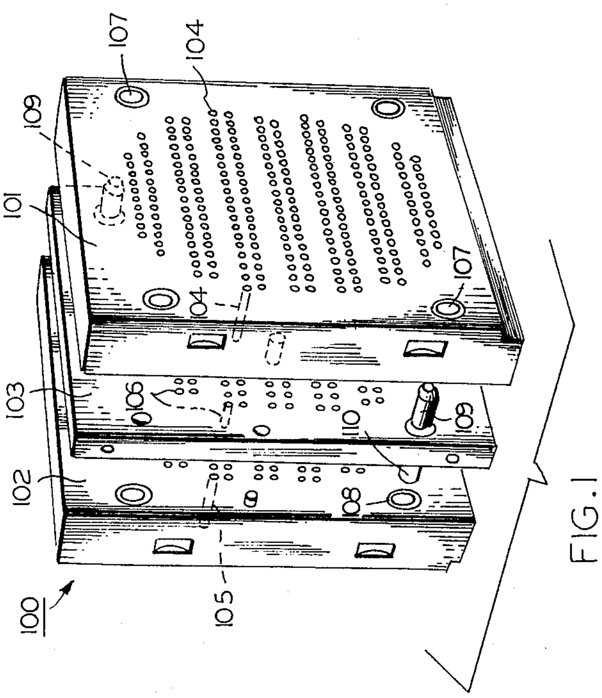
FIG. 1 is a perspective view of a combined magazine used in the system according to the present invention.

Referring to FIG. 1, a combined magazine 100 used in this system is divided into three members; a pair of lead magazines 101 and 102 and said pellet magazine 103 have pluralities of holes 104, 105 and 106 formed therein, respectively. These pluralities of holes 104, 105 and 106 correspond in position to each other and have substantially the same diameter. Said pellet magazine 103 has studs 109 secured to one surface thereof which are arranged to fit into guide sleeves 107 positioned in said lead magazine 101. Said pellet magazine 103 also has studs 110 secured to the opposite surface thereof which are arranged to fit into guide sleeves 108 positioned in said lead magazine 102. Said lead magazines 101 and 102 and said pellet magazine 103 are preferably made of light metal such as aluminum.

Figure 2:
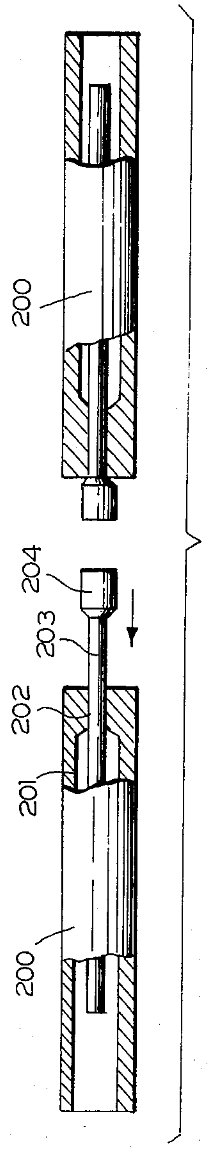
FIG. 2 is a partial sectional view of a terminal lead embedded in an electrical component and a tubular pin used in this system.

Before said lead magazines 101 and 102 are combined with said pellet magazine 103 into said combined magazine 100, said lead magazines 101 and 102 are adapted to have a plurality of tubular pins 200 inserted into the plurality of holes 104 and 105 thereof, by any suitable and available method. Each of said tubular pins 200 has a bore 201 formed in the center thereof, as shown in FIG. 2, said bore 201 has a reduced diameter inlet portion 202 at one end thereof. A terminal lead 203 having a head 204 formed at one end thereof can be slidably inserted into said bore 201 until said head 204 engages the end of said tubular pin 200 at inlet portion 202. Before said tubular pins 200 are inserted into said holes 104 and 105, said tubular pins 200 have the leads 203 inserted into the bores 201 thereof by an appropriate means.

Figure 3:
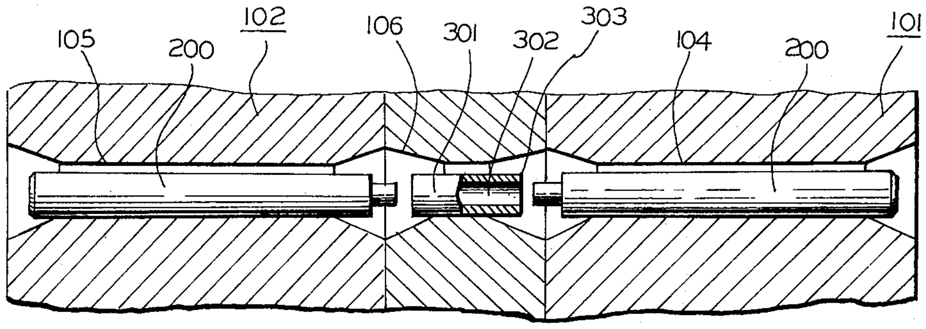
FIG. 3 is a sectional view illustrating the manner of assembling the tubular pins and a raw pellet for the electrical component within holes formed in the combined magazine prior to transfer to a die compacting station of this system.

Before the thus loaded pellet magazine 103 is combined with said lead magazines 101 and 102, said pellet magazine 103 has a plurality of pellets 301 positioned within the holes 106 by any suitable and available means, as seen in FIG. 3. Each of said pellets 301 consists of a resistor body 302 and an insulator 303 enveloping said resistor body 302. Said resistor body 302 comprises carbon powder and fillers such as finely divided silica powder dispersed in a solidifying insulating binder such as phenol-aldehyde resin. Said insulator 303 can be made of any insulating resin such as phenol-aldehyde resin.

When the loaded magazines 101, 102, and 103 are combined, the parts are positioned as shown in FIG. 3, with the pellets 302 and the lead containing tubes 200 axially aligned. The ends of the bores 104, 105 and 106 are enlarged for ease in loading the parts into them.

Figure 5:
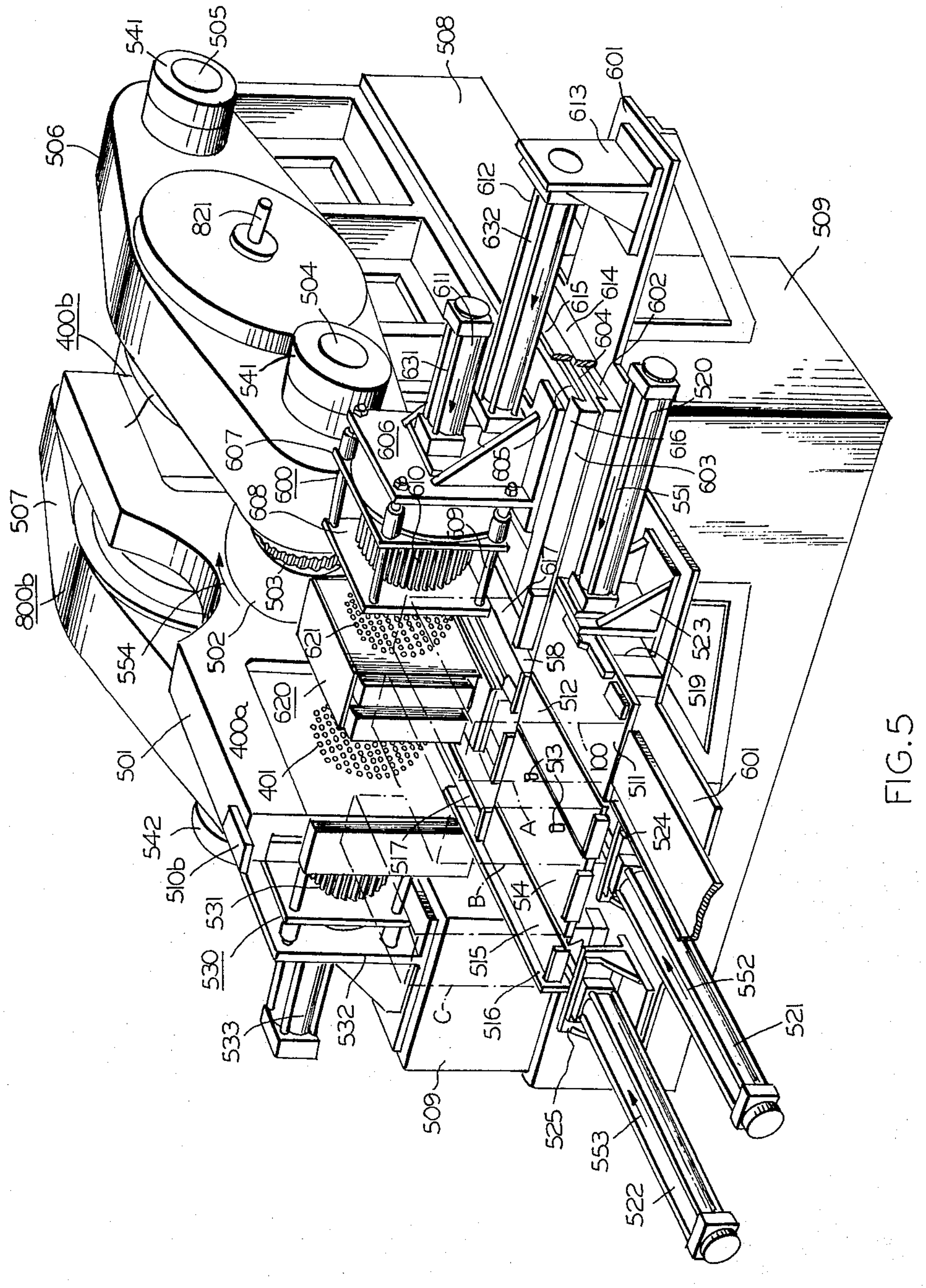
FIG. 5 is a perspective view of the assembly and die compacting machine of this system.
Figure 7:
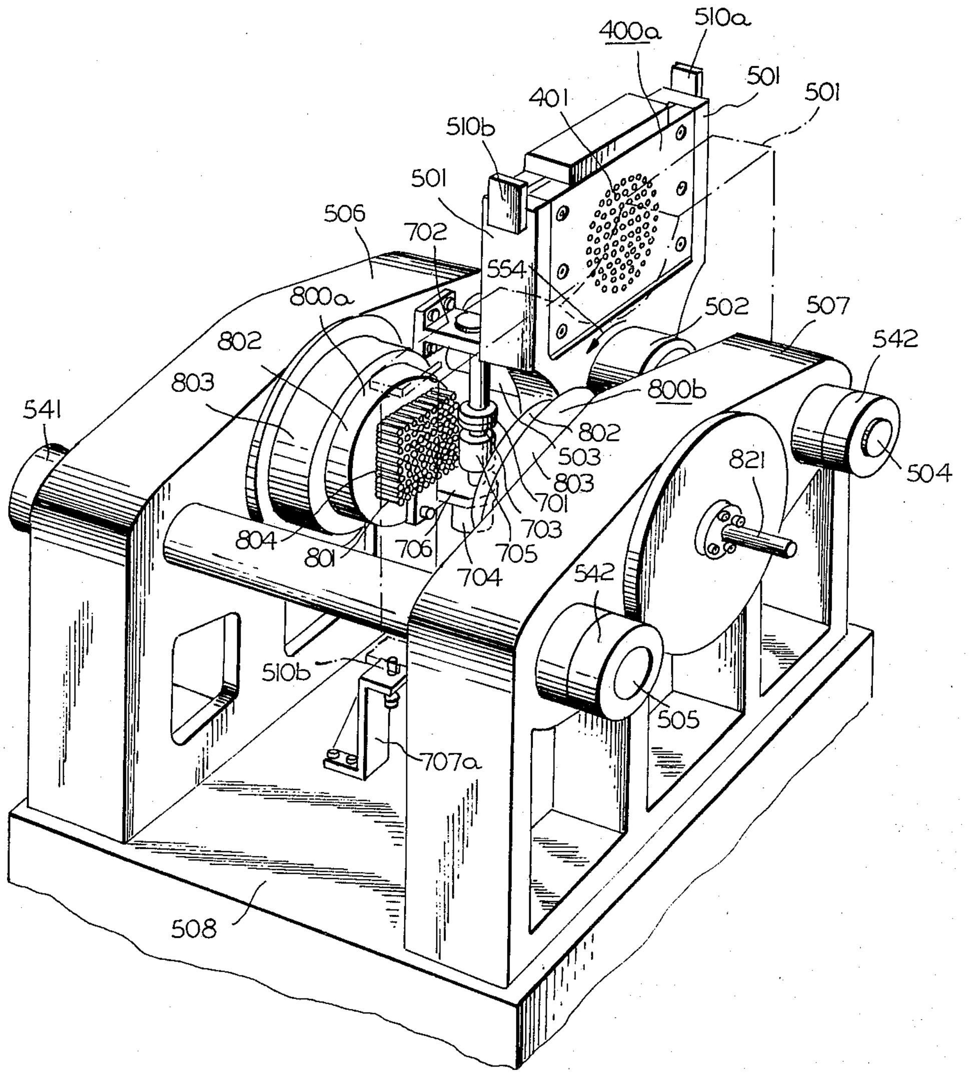
FIG. 7 is a perspective view of the back of the assembly and die compacting machine.

Referring to FIGS. 5 and 7, two die frames 400*a* and 400*b* are secured to a rotary frame 501. Each of said two die frames 400*a* and 400*b* has a plurality of die-holes 401 formed therein. Said rotary frame 501 has a large bearing member 502 at the center axis thereof. Said bearing member 502 has a large worm wheel 503 mounted coaxially thereon. Said worm wheel 503 meshes with a worm 701 (FIG. 7) which is supported by two bearing members 702 and 703, and which is connected through a coupling 705 to a motor 704. Said bearing members 702 and 703 are secured to a base frame 506. Said motor 704 is also secured to said base frame 506 by a support 706. Said motor 704 can rotate clockwise and counterclockwise alternatively. In FIG. 5, the die frame 400*a* occupies a loading and unloading position and the die frame 400*b* occupies a pressing position. Rotation of said motor 704 rotates said rotary frame 501 about a shaft 504 so that said two die frames 400*a* and 400*b* exchange places with each other. At said loading and unloading position the respective die frames 400*a* and 400*b* are loaded with the plurality of pellets 301 and the plurality of leads 203 in the pins 200 by a loading means that will be described later. At said pressing position the respective die frames 400*a* and 400*b* are positioned, as shown in chain lines in FIG. 7, between two multi-head presses 800*a* and 800*b* which are opposed to each other. Said rotary frame 501 has two stop members 510*a* and 510*b* secured thereto. A stop 707*a* and a corresponding stop (not shown) are fixed to bases 508 and 509, respectively. Said stop members 510*a* and 510*b* are adapted to engage said stops so as to stop said die frame 400*a* or 400*b* precisely at said loading and unloading position or said pressing position.

Figure 4:
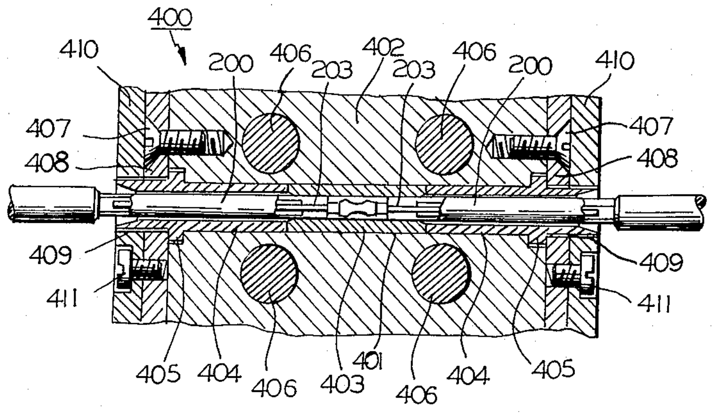
FIG. 4 is a sectional view illustrating the operation of a die compacting machine of this system.

Further details of the construction of said die frames 400*a* and 400*b* are shown in FIG. 4. Each of said plurality of die holes 401 in said die frame 400*a* and 400*b* has a liner 403 and two sleeves 404 inserted therein. The inner diameter of said liner 403 exactly corresponds to the outer diameter of the pin 200. Said liner 403 is held by said sleeves 404. Each of said sleeves 404 has a flange 405 formed on the outside surface thereof. Said flange 405 is held by a cover board 408 in a recess in the surface of the die frame, and the sleeve extends through an opening 409 in the cover board. Flange 405 serves to maintain the position of said liner 403 in said hole 401. A cover board 408 is attached to both surfaces of the die frames 400*a* and 400*b* and is secured to them by screws 407. Said cover boards 408 each have a layer 410 of a thermal-insulating material covering the whole surface of said board 408. Said layer 410 is fixed on said cover board 408 by set screws 411. The material 402 of the frames is preferably good thermally conductive metal, for example teluric cuprum etc. Said liner 403 is preferably made of a super hard alloy.

Heating means for heating the pellets 301 loaded into the die frames 400*a* and 400*b* will be described with reference to FIG. 4. Heating members 406 are embedded in said die frames 400*a* and 400*b*. Said heating members 406 are preferably pipes for circulating hot oil or electric heaters embedded in said die frame. The temperature of said die frames 400*a* and 400*b* is precisely controlled by an electronic temperature regulator.

The pellets 301 and the leads 203 in the tubular pins 200 accommodated in the combined magazine 100, are transferred to a loading position in the die compacting machine 500 by transfer means, which will be described in more detail hereinafter. Said transfer means also transfers said magazine 100 from said loading position to an unloading position where said magazine 100 faces one of said die frames 400*a* and 400*b* to receive a plurality of composition resistors from said die frames 400*a* and 400*b*.

Referring to FIG. 5, said transfer means comprises a shifter 519 driven by a hydraulic cylinder 520, a slidable platform 512 driven by a hydraulic cylinder 521, and a slidable platform 515 driven by a hydraulic cylinder 522. Said hydraulic cylinder 520 is secured to a bracket 523 fixed to a deck 601 which is mounted on the base 509. Said shifter 519 is attached to the piston-rod of said hydraulic cylinder 520. Said cylinder 521 is secured to a bracket 524 fixed to said deck 601. Said cylinder 522 is secured to a bracket 525 fixed to said deck 601. Said slidable platform 512 is connected to the piston-rod of said hydraulic cylinder 521 and can slide along guide rails 518 and 617 in the direction of the arrow 552. Said guide rail 518 is fixed to said deck 601 and said guide rail 617 is mounted on a slidable table 603 that will be described later. Said slidable platform 515 is connected to the piston-rod of said hydraulic cylinder 522, and can slide in the direction of the arrow 553 along a guide rail 517 fixed to said deck 601. A stop 516 is attached to the side of said guide rail 517. Plates 511 and 514 are fixed to said deck 601 on the same level as said slidable platforms 512 and 515. Said plate 514 has retractable studs 513 attached thereto, which are adapted to be retracted downwards by any suitable and available mechanism.

After the combined magazine 100 has been provided with the pellets 301 and the leads 203 in the tubular pins 200 are inserted into the holes 104, 105, and 106 thereof, said combined magazine 100 is placed on said plate 511 by any suitable and available conveyance means, as shown in chain lines A. Upon actuation of the hydraulic cylinder 520, the shifter 519 pushes said magazine 100 from said plate 511 to the position shown in chain lines 8 on the platform 512 in the direction of the arrow 551. Said retractable studs 513 serve for exact positioning of said combined magazine 100 on said platform 512. When the hydraulic cylinder 521 is actuated, said platform 512 is moved along the guide rails 518 and 617 in the direction of the arrow 552 so as to move said combined magazine 100 to the loading position, in which said magazine 100 is located between a loader 600 and a preheater 620, both of which will be described later. At said loading position, said pellets 301 with said leads 203 in the tubular pins 200 are loaded from said combined magazine 100 into said preheater 620 by operation of said loader 600. Then, said cylinder 521 draws said platform 512 back in the direction opposite the arrow 552 so as to return the emptied magazine 100 to the position B. Said retractable studs 513 are retracted downwards, and said hydraulic cylinder 520 is actuated again. Said shifter 519 pushes and slides the emptied magazine 100 across the plate 514 and onto the platform 515 until said magazine 100 touches the stopper 516. Now, said emptied combined magazine 100 is located at a position C, also shown in chain lines. After said shifter 519 returns to its initial position, said retractable studs 513 are again raised. Upon actuation of the hydraulic cylinder 522, said slidable platform 515 is moved along the guide rail 517 so as to bring said emptied combined magazine 100 to the unloading position, where said magazine 100 is located between said preheater 620 and the die frame **400*a* occupying the die frame loading and unloading position. At said unloading position, plural composition resistors formed within said die frame 400*a* will be unloaded from said die frame 400*a* into said emptied combined magazine 100 by the operation of an unloader 530 that will be described later. After such an unloading operation, said cylinder 522 draws said platform 515 back in the opposite direction to the arrow 553 so as to return the combined magazine 100 to the position C. Then, said combined magazine 100 filled with resistors is displaced from said platform 515** by any suitable and available conveyance means.

Figure 6:
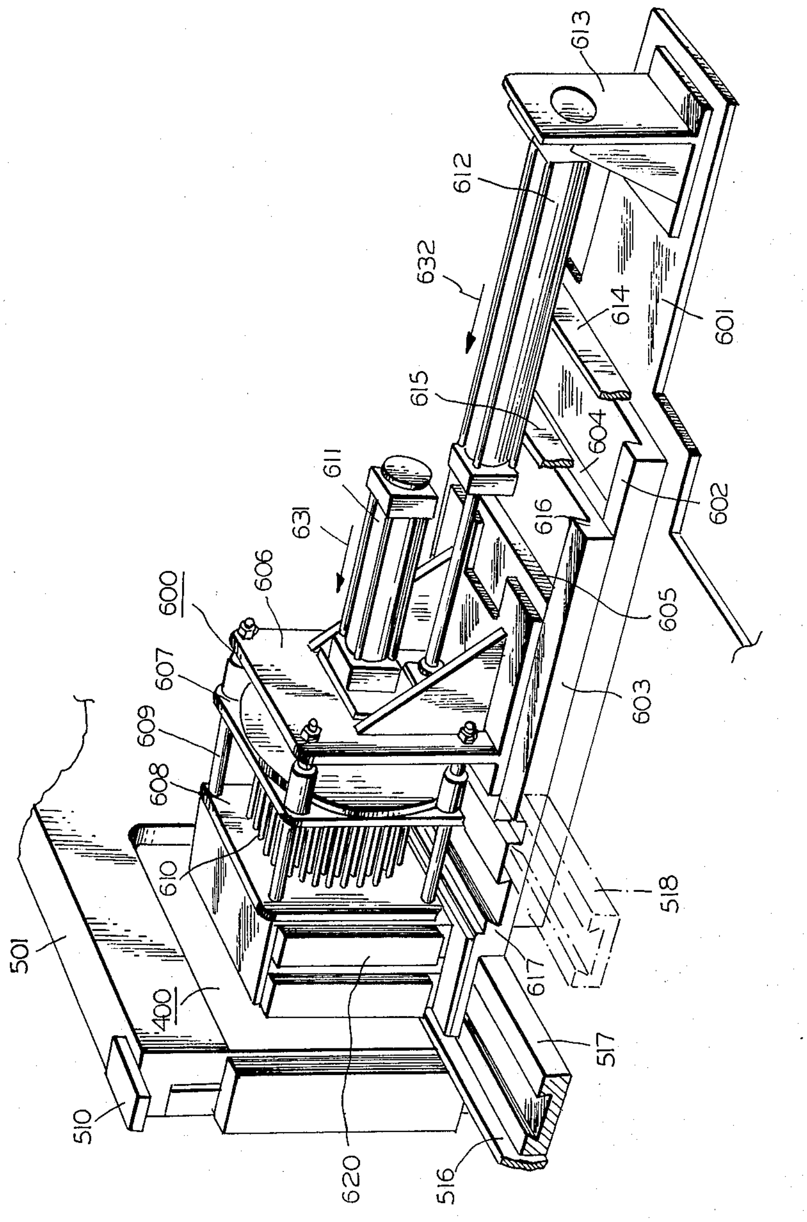
FIG. 6 is a perspective view of a part of the machine shown in FIG. 5 and showing means for loading the tubular pins and the pellets into a die frame of the machine, wherein a preheater and a loader are shown at their respective second loading positions.

Referring to FIGS. 5 and 6, means for loading the plural pellets 301 and the leads 203 in the tubular pins 200 into the die frame **400*a* or 400*b* comprises the loader 600, the preheater 620 and sliding means by which said loader 600 and said preheater 620 are moved from respective first position (shown in FIG. 5) to respective second positions (shown in FIG. 6). Said sliding means comprises a guide rail 602, a table 603 and a hydraulic cylinder 612. Said guide rail 602 is secured to the deck 601. Said guide rail 602 has a stop 614 attached thereto. Said table 603 has a dovetail portion 604 formed thereon, which is slidably fitted in said guide rail 602. Furthermore, said table 603 has guide rails 616 and 617 therein and mounting means for said preheater 620 formed thereon. A stop 615 is attached to said table 603. A dovetail member 604 upon which said loader 600 is mounted, is slidably fitted in said guide rail 616. Said hydraulic cylinder 612 is fixed to said deck 601 through a bracket 613. The piston-rod of said hydraulic cylinder 612 is connected to a bracket 606 on said loader 600**.

Said loader 600 comprises a plurality of protruding rods 610 fixed to a sliding plate 607 and a hydraulic cylinder 611 fixed to said bracket 606. Said sliding plate 607 is slidably supported on four guide posts 609 which are mounted on said brackets 606. A plate 608 which has a plurality of holes therein for guiding said protruding rods 610, is fixed to the ends of said four guide posts 609. Said protruding rods 610 are in positions corresponding to the plurality of holes 104, 105 and 106 of the combined magazine is in the loading position. Said hydraulic cylinder 611 has a piston-rod (not shown) which is connected to the center of said sliding plate 607.

Said preheater 620 has a plurality of holes 621 formed therein in positions corresponding to the positions of the holes 104, 105 and 106 of the combined magazine when the magazine is in the loading position. The thickness of said preheater 620 is great enough to accommodate the length of the pellets 301 and two of the pins 200 having the leads 203 therein. Thus, said plurality of holes 621 can receive the plurality of pellets 301 with the leads 203 in the pins 300 from said combined magazine 100. Said preheater 620 can be heated up to a temperature near that of the die frames **400*a* and 400*b*** by any suitable and available means, such embedded electric heaters.

In FIG. 5, the loader 600 and the preheater 620 occupy the respective first positions. The combined magazine 100 which has the pellets 301 and the leads 203 in the pins 200 loaded therein, is placed in the loading position thereof by the transfer means previously described. When the hydraulic cylinder 611 is actuated, the piston-rod of said cylinder 611 pushes and slides the sliding plate 607 in the direction of the arrow 631 along the guide posts 609 so that the protruding rods 610 extend into the holes 104, 105 and 106 of said combined magazine 100. Thus, said pellets 301 with the leads 203 in the pins 200 are pushed from said holes 104, 105 and 106 into the holes 621 of the preheater 620. Said pellets 301 with the leads 203 in the pins 200 are preheated up to a certain temperature by said preheater 620. Then, said hydraulic cylinder 611 draws said protruding rods 610 back to the initial position thereof. After the combined magazine 100 is withdrawn from said loading position and moved to the unloading position and then withdrawn. Upon actuation of the hydraulic cylinder 612, the piston rod of the cylinder 612 pushes the bracket 606 in the direction of the arrow 632. Then, the dovetail member 605 is moved along the guide rail 616 until the front edge of said dovetail member 605 touches the side wall of the guide rail 617, as seen in FIG. 6; furthermore, the piston-rod of said cylinder 612 continues to slide the table 603 in the direction of the arrow 632 along the guide rail 602 until the front edge of said table 603 touches the stop 516. Thus, said loader 600 and said preheater 620 occupy the respective second positions, as seen in FIG. 6. Here, the positions of the protruding rods 610 correspond to the positions of the plurality of holes 621 in said preheater 620 and to the positions of the plurality of holes 401 in the die frame **400*a* occupying the die frame loading and unloading position. When said hydraulic cylinder 611 is again actuated, the pellets 301 with the leads 203 in the pins 200 are loaded from said plural holes 621 of said preheater 620 into said holes 401 in said die frame 400*a*. After said loading operation, said cylinder 611 draws said protruding rods 610 out the holes 621 of said preheater 620. Then said cylinder 612 draws the piston-rod thereof back and slides said dovetail member 605 in the opposite direction to the arrow 632 along said guide rail 616 until the back edge of said dovetail member 605 touches the stop 615 attached to said table 603. After that, said table 603 is returned to its initial position as said stop 615 is drawn back by said dovetail member 605. The stopping position of said table 603 is exactly regulated by the stop 614. Thus, said loader 600 and said preheater 620** are returned to the respective first positions.

The plurality of pellets 301 are heated in the die frame and then are pressed so as to compact them. The die frame **400*a* is transferred from its loading and unloading position to the pressing position, where said die frame 400*a* is located between the pair of multi-head presses 800*a* and 800*b*. Now referring to FIGS. 5 and 7, the heated pellets 301 in the holes 401 of the die frame 400*a* or 400*b* are compacted by pressing means consisting essentially of the pair of multi-head presses 800*a* and 800*b* which are opposed to each other. Said multi-head presses 800*a* and 800*b* are fixed to the frames 506 and 507, respectively. Said frames 506 and 507 are mounted on the base 508, and are coupled to each other by connecting shafts 504 and 505. Said shaft 504 serves also as the axis of the swinging motion of the rotary frame 501, as described previously. Said shafts 504 and 505 have double nuts 541 and 542 on both ends thereof, respectfully. Said shafts 504 and 505 and said nuts 541 and 542 are adapted to withstand large tensile force caused by said pair of multi-head presses 800*a* and 800*b*. Each of said multi-head presses 800*a* and 800*b* comprises plurality of pressing punches 801, a guide member 802 and a cover member 803. Said guide member 802 has a plurality of holes 804 therein through which said punches 801** slide. Said punches 801 are in positions corresponding to the positions of the plurality of holes 401 in the die frames 400*a* and 400*b* when they are located at the pressing position.

Figure 8:
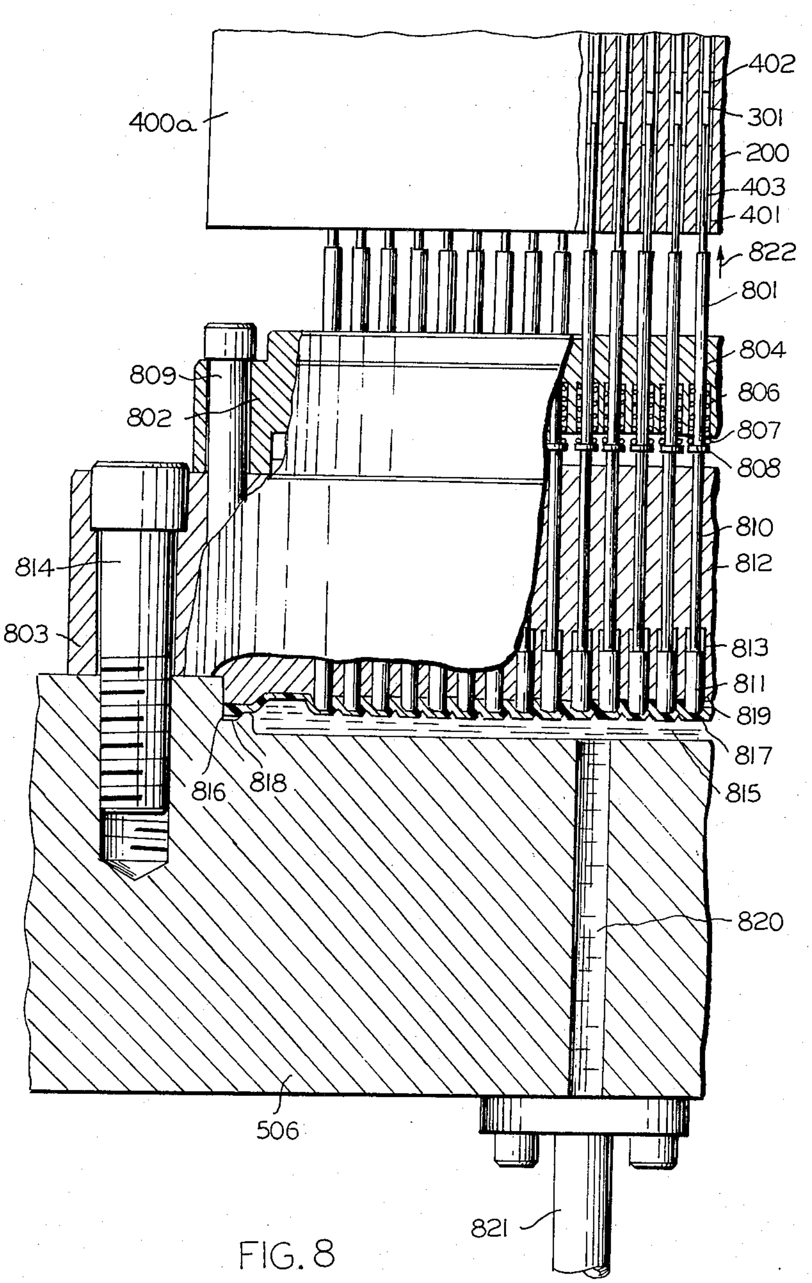
FIG. 8 is a sectional view of a multi-head press with which the die compacting machine is provided showing the internal construction thereof.

As seen in FIG. 8 in which one of said multi-head presses 800*a* and 800*b* is shown in position relative to one of said die frames 400*a* and 400*b* at the pressing position, said guide member 802 is secured to said cover member 803 by screws 809. Said cover member 803 is secured to one of said frames 506 and 507 by screws 814, and covers a circular shallow recess 815 formed at said frame 506 or 507. Said plural punches 801 slide through the guide holes 804 formed in said guide member 802. A plurality of piston-rods 810 are positioned in guide holes 812 in said cover member 803. Said guide holes 804 and said guide holes 812 are aligned with each other so that each of said punches 801 is in alignment with one of the piston-rods 810. Each of said guide holes 804 has a compression spring 807 in an enlarged portion 806 thereof. Each spring 807 urges the punch 801 on which it is positioned toward the piston rods 810 by engagement with a collar 808 at the end thereof. Each of the guide holes 812 has an enlarged bore 813 at the end thereof in which engages a piston 811 formed on the end of the piston-rod 810. The end of said piston 811 projects toward the recess 815 and is supported by a rubber diaphragm 817. Each piston 811 has a guard ring 819 attached to the cylindrical surface thereof. Said ring 819 prevents said diaphragm 816 from being over-deformed locally at the region of engagement between said side surface of said piston 811 and said cover member 803. Said guard ring 819 has a shape of O-ring and is preferably made of hard rubber or tetra-fluoro-ethylene. Said diaphragm 817 has a rib 818 at the periphery thereof. Said rib 818 is engaged in a circular groove 816 formed in the frame 506 and which encircles said circular shallow recess 815. Said rib 818 secures said diaphragm 817 to said cover member 803 and prevents leakage of a pressure medium from a pressure source supplied to said recess 815, enclosed by said diaphragm 817 and said frame 506, is filled by a high pressure fluid through a supply conduit 821 and a bore 820.

Said multi-head presses 800*a* and 800*b* can be designed in such a way that a punch having a piston formed at one end thereof, serves both as said punch 801 and piston-rod 810. Said guide member 802 and said cover member 803 are then combined into a combined guide member. Said combined guide member has a plurality of guide holes for receiving the plurality of punches. Each of said guide holes has a bore in which said piston portion of said punch is positioned. Said bore contains the compressing spring encircling said punch. In this case, said combined guide member should have a thickness larger than that of said cover member 803.

When the high pressure fluid is introduced into said recess 815 from any suitable and available pressure source, each of the pistons 811 has fluid pressure applied to the end thereof through said diaphragm 817. Said piston-rod 810 is moved against the biasing force of the compressing spring 807 along the guide hole 812 in the direction of the arrow 822 moving the punch 801 until said punch 801 touches the pin 200 in the die frame 400*a* (FIG. 8). Then, each of the punches 801, acting independently of the others, presses the pin 200 and thus compacts pellet 301. When the pressure is stopped and the pressure in said recess is relieved, said springs 807 press each of said punches 801 in the opposite direction to the arrow 822. Thus, each of said punches 801 is retracted in association with the piston-rods 810.

The plurality of pellets 301 within the die frame 400*a* are thus formed into a plurality of composition resistors. The die frame 400*a* is then returned to its loading and unloading position. The composition resistors are unloaded from said die frame 400*a* into the empty combined magazine 100 by unloading means consisting of the unloader 530. Said unloader 530 has a construction similar to that of the loader 600 described previously. Said unloader 530 comprises a plurality of protruding rods 531 and a hydraulic cylinder 533 fixed to a bracket 532. Said bracket 532 is directly secured to the base 509. Said protruding rods 531 are in positions corresponding to the positions of the holes 401 in the die frame 400*a* when the die frame is positioned in its loading and unloading position.

When said hydraulic cylinder 533 is actuated, said protruding rods 531 are inserted into said holes 401 in said die frame 400*a*. Thus, the composition resistors with the leads and pins 300 are unloaded from said holes 401 into the holes 104, 105 and 106 of the empty combined magazine 100 which is located in the unloading position, as described previously.

The overall operation of the system according to the present invention is as follows.

After the leads 203 are inserted into the central bores 201 of the tubular pins 200, said tubular pins 200 are inserted into the holes 104 and 105 of the lead magazines 101 and 102. (FIGS. 1 and 2). The pellet magazine 103 has pellets 301 positioned in the holes 106 thereof. Said pellet magazine 103 is sandwiched between said pair of lead magazines 101 and 102, and the three magazines 101, 102 and 103 are combined into the combined magazine 100. (FIG. 1). Said combined magazine is positioned upon the plate 511 in position A in FIG. 5. Said combined magazine 100 is transferred, by the transfer means, from said plate 511 to the loading position which is located between the loader 600 and the preheater 620. The pellets 301 and the pins 200 having the leads 203 therein are loaded from said combined magazine 100 into said preheater 620 by the operation of said loader 600. Said pellets 301 and said pins 200 are preheated up to a temperature of 100° to 250° C. The preheating means is used to help keep the temperature of the die frames 400*a* and 400*b* more uniform when said die frames 400*a* and 400*b* receive the pellets 301 and the pins 200. Preheated pellets 301 and pins 200 are loaded by the loading means from said preheater 620 into the die frame 400*a* at the loading and unloading position of the die frame. (FIGS. 5 and 6). When the motor 704 is rotated clockwise, the wheel 503 meshed with the worm 701 causes the rotary frame 501 to swing around the shaft 504 in the direction of the arrow 554. Thus, said die frame 400*a* is shifted from its loading and unloading to the pressing position. (FIG. 7) At the same time the die frame 400*b* is shifted from the pressing position to the die frame loading and unloading position. The punches 801 are actuated to compact the pellets 301 heated in the holes 401 of said die frame 400*a*, as seen in FIG. 4. The heads 204 of the leads 203 are embedded in the both ends of the pellet 301 and the resistor body 302 and the insulator 203 are die compacted into an intimate and integral bonded body. The resinous binders included in the resistor body 302 and insulator 303 are cured at a temperature of 150° to 250° C. Said motor 704 rotates counterclockwise so that said rotary frame 501 swings around said shaft 504 in the opposite direction to the arrow 554. Said die frame 400*a* is returned to said die frame loading and unloading position. At the same time said die frame is shifted to the pressing position. The empty combined magazine 100 is moved by said transfer means, to its unloading position located between said die frame 400*a* and said preheater 620. The composition resistors formed within said die frame 400*a* are unloaded into the empty magazine 100 by the unloader 530. (FIG. 5). Each of said composition resistors is still accompanied by the two pins 200 having the leads 203 inserted therein. Said composition resistors and the pins 200 are unloaded from the combined magazine 100 by any available means. The pins 200 are detached from each of said composition resistors. The combined magazine 100 is divided into the pair of lead magazines 101 and 102 and the pellet magazine 103 to receive new pellets 301 and leads 203.

It is apparent that the die frame 400b can be unloaded and reloaded with a new batch of pellets 301 and tubular pins 200 with leads 203 from another combined magazine 100 through the preheater 620 while the pellets 301 in the die frame 400*a* are being pressed. It is also apparent that said die frame 400*b* is shifted to the pressing position and said new batch of pellets 301 can be pressed in said die frame 400*b* while the die frame 400a is being shifted to its loading and unloading position and unloaded and reloaded.

The system according to the present invention makes it possible to form the plurality of pellets 301 into a plurality of composition resistors batch by batch in sequence. The multi-head presses 800a and 800b can compact the pellets 301 equally at the predetermined pressing or compacting force. The plurality of die-holes 401 are heated to the same temperature as each other. The mechanism by which the punches 801 compact the pellet 301 through the pins 200 ensures a close fit between the die and the punch for a long time.

The system according to the present invention, furthermore, makes it possible to manufacture automatically hundreds of resistors batch by batch when said system further includes the following combination of apparatuses and conveyance means.

Figure 9:
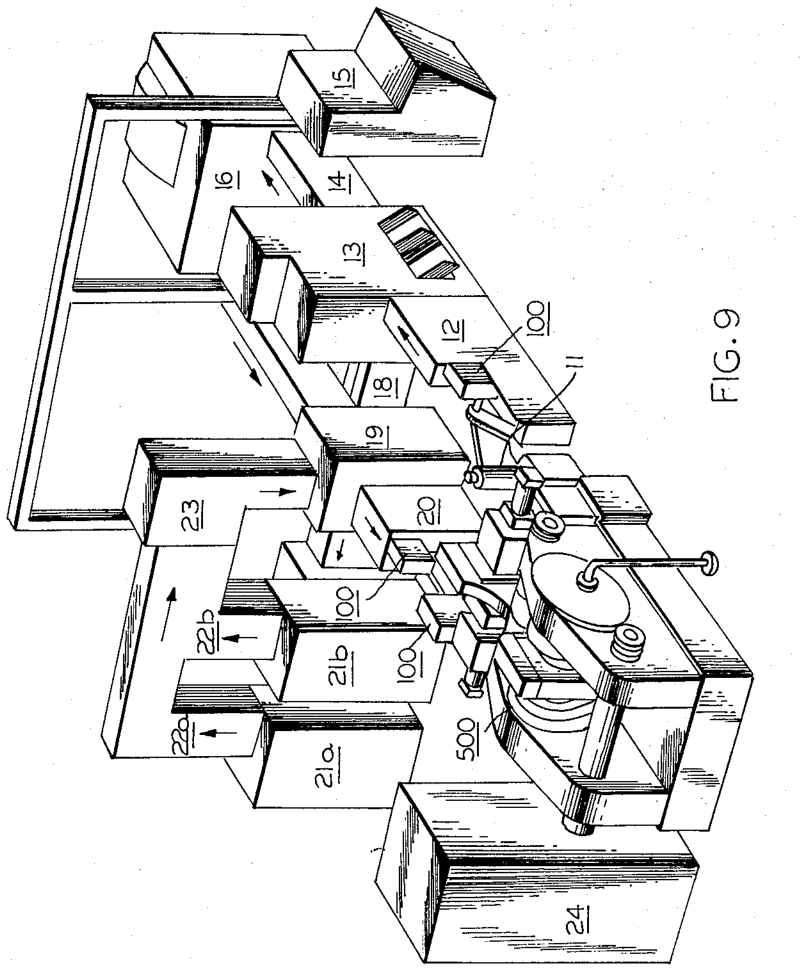
FIG. 9 is the perspective view of the whole system in accordance with the present invention.

Referring to FIG. 9, the combined magazine 100 which has receiving the plurality of finished composition resistors is transferred from the slidable platform 515 (FIG. 5) to a conveyor 12 by a magazine unloader 11. Said combined magazine 100 is transferred to a detaching apparatus 13 by said conveyor 12. In said detaching apparatus 13, the finished resistors are unloaded from said combined magazine 100. The combined magazine 100 is divided into the pellet magazine 103 and the pair of lead magazines 101 and 102 (FIG. 1). The pins 200 are detached from said resistors and returned to said pair of lead magazines 101 and 102 and are inserted into the holes 104 and 105 of said magazines 101 and 102. Said pellet magazine is conveyed to pellet loaders 21a and 21b by a conveyor 18. Said pellet loaders 21a and 21b insert pellets 301 into holes 106 of said pellet magazine 103. The two pellet loaders 21a and 21b make it possible to change the composition of the pellets 301 during operation of the present system. On the other hand, said pair of lead magazines 101 and 102 having the pins 200 inserted into the holes 104 and 105 thereof are conveyed to a pin preparation apparatus 16 through a conveyor 14. Said pin preparation apparatus 16 inserts leads 203 into the central bores 201 of the pins 200 (FIG. 2). Said pair of lead magazines 101 and 102 having the pins 200 inserted into the holes 104 and 105 thereof, are transferred to a magazine assembler 19 by a conveyor 17. Said pellet magazine 103 having the pellets 301 inserted into the holes 106 thereof, is transferred to a sequencer 23 by respective elevators 22a and 22b. Said sequencer 23 causes said pellet magazine 103 to transfer coincidently with the arrival of a pair of lead magazines 101 and 102, and sends said pellet magazine 103 to said magazine assembler 19. Said magazine assembler 19 inserts said pellet magazine 103 between the lead magazines 101 and 102 and combines the three magazines 101, 102 and 103 into the combined magazine 100 (FIG. 1). Said combined magazine 100 is transferred onto the platform 511 (FIG. 5) by a conveyor 20. Said system further includes a main control desk 15 to control and supervise whole apparatus and a controller 24 for controlling the die compacting machine 500 with respect to the temperature, pressure and operation cycles thereof.

The system for die compacting electric components according to the invention has been described as being adapted to manufacturing so-called carbon composition resistors. However, the system is readily applicable to the manufacture of other electric components with coaxial leads such as varistors, thermistors and/or capacitors, without substantial modification of the system. When the pellets comprise thermoplastic resins such as polystyrene, poly-ester and/or poly-vinyl-chloride instead of thermosetting resins such as phenol-aldehyde resin, the die frame has to be cooled when the formed components are unloaded from said die frame. In such a case, said die frame is heated preferably by circulating hot fluid. For manufacturing varistors with coaxial leads, the pellets are made of a semiconducting material such as silicon carbide etc. For the purpose of manufacturing capacitors with coaxial leads, the pellets are made of finely divided dielectric material such as barium titanium oxide etc.

While particular embodiments of this invention have been shown and described, it will, of course, be apparent that various modifications may be made without departing from the invention.

We claim:

1. Apparatus for assembling and die compacting electric components having coaxial leads comprising:

1. a combined magazine consisting of a pair of lead magazines and a pellet magazine sandwiched between said pair of lead magazines, said pair of lead magazines having a plurality of holes therein and tubular pins in said holes, each of said pins being adapted to hold a single lead therein, and said pellet magazine having a plurality of holes therein aligned with said holes in said lead magazines and adapted to hold pellets therein;
2. transfer means on which said combined magazine is removably positioned, said transfer means being movable for transferring said combined magazine to a loading position;
3. at least one die frame having a plurality of holes therein and positionable adjacent said loading position;
4. loading means for loading pellets, each accompanied by two leads in the pins at both ends thereof from said combined magazine at said loading position into the holes in said die frame;
5. heating means operatively associated with said die frame for heating said pellets in said die frame;
6. pressing means operatively associated with said die frame and having projecting portions movable into said holes in said die frame for compacting the heated pellets through said pins independently of each other, whereby each of said pellets has two leads embedded into both ends thereof to form an electrical component with coaxial leads; and
7. unloading means operatively associated with said die frame for unloading the formed components from said die frame into an empty combined magazine.

2. Apparatus as claimed in claim 1, wherein said die frame is movable between loading and unloading position and a pressing position, the loading position of said combined magazine being adjacent the loading and unloading position of said die frame, said unloading means being adjacent said die frame loading and unloading position, and said pressing means being adjacent said pressing position.

3. Apparatus as claimed in claim 1, which further comprises preheating means positioned between said magazine loading position and said die frame loading and unloading position for preheating said pellets and said leads in said pins before they are loaded into said die frame, said loading means being operatively associated with said preheating means for transferring said pellets from said combined magazine at said loading position into the preheater, and further for transferring the preheated pellets into the holes of said die frame.

4. Apparatus as claimed in claim 1, wherein said pressing means comprises a plurality of punches for pressing said pins independently of each other, respectively, and a guide member having a plurality of guide holes formed therein; through which said punches are slidable.

5. Apparatus as claimed in claim 4, in which said pressing means has a single pressure source and a diaphragm thereover against which said punches are engaged, whereby said plurality of punches is operated by said single pressure source.

6. Apparatus as claimed in claim 5, wherein said diaphragm has a rib around the periphery thereof securing said diaphragm to said guide member and protecting against leakage of said pressure medium from said pressure source.

7. Apparatus as claimed in claim 5, wherein each of said plurality of punches has a guard ring on the peripheral surface thereof adjacent said diaphragm, said guard ring preventing said diaphragm from being overdeformed.

* * * * *